(12) United States Patent
Khatavkar et al.

(10) Patent No.: US 8,987,615 B2
(45) Date of Patent: Mar. 24, 2015

(54) AXLE LOAD MONITORING SYSTEM (ALMS)

(71) Applicant: American Axle & Manufacturing, Inc., Detroit, MI (US)

(72) Inventors: Vijay M. Khatavkar, Pune (IN); Bhan P. S. Sengar, Pune (IN); Rohit Tikekar, Pune (IN); Abhijit V. Nilangekar, Pune (IN); Ajay G. Guddeti, Pune (IN)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/189,150

(22) Filed: Feb. 25, 2014

(65) Prior Publication Data

US 2014/0238146 A1    Aug. 28, 2014

(30) Foreign Application Priority Data

Feb. 27, 2013   (IN) .......................... IN579MUM2013

(51) Int. Cl.
| | |
|---|---|
| *G01G 19/08* | (2006.01) |
| *G01L 1/00* | (2006.01) |
| *G01L 1/22* | (2006.01) |
| *G01L 1/04* | (2006.01) |
| *G01G 19/22* | (2006.01) |

(52) U.S. Cl.
CPC ...... *G01L 1/00* (2013.01); *G01G 19/22* (2013.01); *B60G 2400/60* (2013.01); *B60G 2204/11* (2013.01)
USPC ............... 177/136; 702/41; 702/42; 702/173; 702/174; 73/862.627; 73/862.632; 73/862.621

(58) Field of Classification Search
CPC . G01G 19/22; B60G 2204/11; B60G 2400/60
USPC .............. 177/136, 211; 702/41–42, 173–174; 73/862.621, 862.627, 862.631, 73/862.637, 862.474, 862.629, 862.632
See application file for complete search history.

(56) References Cited

U.S. PATENT DOCUMENTS

| | | | | |
|---|---|---|---|---|
| 3,780,817 | A | * | 12/1973 | Videon .......................... 177/136 |
| 4,042,049 | A | * | 8/1977 | Reichow et al. ............... 177/137 |
| 4,102,031 | A | * | 7/1978 | Reichow et al. ................ 29/464 |
| 4,478,091 | A | | 10/1984 | Forrester |
| 4,641,714 | A | | 2/1987 | Ferioli et al. |
| 4,884,644 | A | * | 12/1989 | Reichow ........................ 177/137 |
| 5,079,535 | A | * | 1/1992 | Neuman et al. .................... 338/2 |
| 5,327,791 | A | | 7/1994 | Walker |
| 5,684,254 | A | | 11/1997 | Nakazaki et al. |
| 5,965,849 | A | | 10/1999 | Ikoma |
| 6,983,665 | B2 | | 1/2006 | Miyazaki et al. |
| 7,140,530 | B2 | * | 11/2006 | Durand et al. ............. 228/234.1 |

(Continued)

*Primary Examiner* — Lisa Caputo
*Assistant Examiner* — Jonathan Dunlap
(74) *Attorney, Agent, or Firm* — Harness, Dickey & Pierce, P.L.C.

(57) ABSTRACT

An axle load monitoring system configured for use on an axle housing is provided. The axle load monitoring system can include a mounting structure and a strain gauge. The mounting structure can have a first end portion, a second end portion and an intermediate portion. The first end portion can be fixedly coupled to the axle housing. The second end portion can be fixedly coupled to the axle housing. The intermediate portion can be offset away from the axle housing. The strain gauge can be fixedly coupled to the mounting structure at the intermediate portion. The strain gauge can be configured to measure strain of the mounting structure.

22 Claims, 4 Drawing Sheets

(56) References Cited

U.S. PATENT DOCUMENTS

| | | |
|---|---|---|
| 7,240,571 B2 | 7/2007 | Walker |
| 7,688,216 B2 | 3/2010 | Mizutani et al. |
| 8,062,065 B2 | 11/2011 | Whiteman, Jr. et al. |
| 2004/0231776 A1 | 11/2004 | Skoff |
| 2005/0081649 A1 | 4/2005 | Takahashi |
| 2007/0296173 A1 | 12/2007 | Regnell et al. |
| 2009/0048790 A1 | 2/2009 | Geraghty et al. |

* cited by examiner

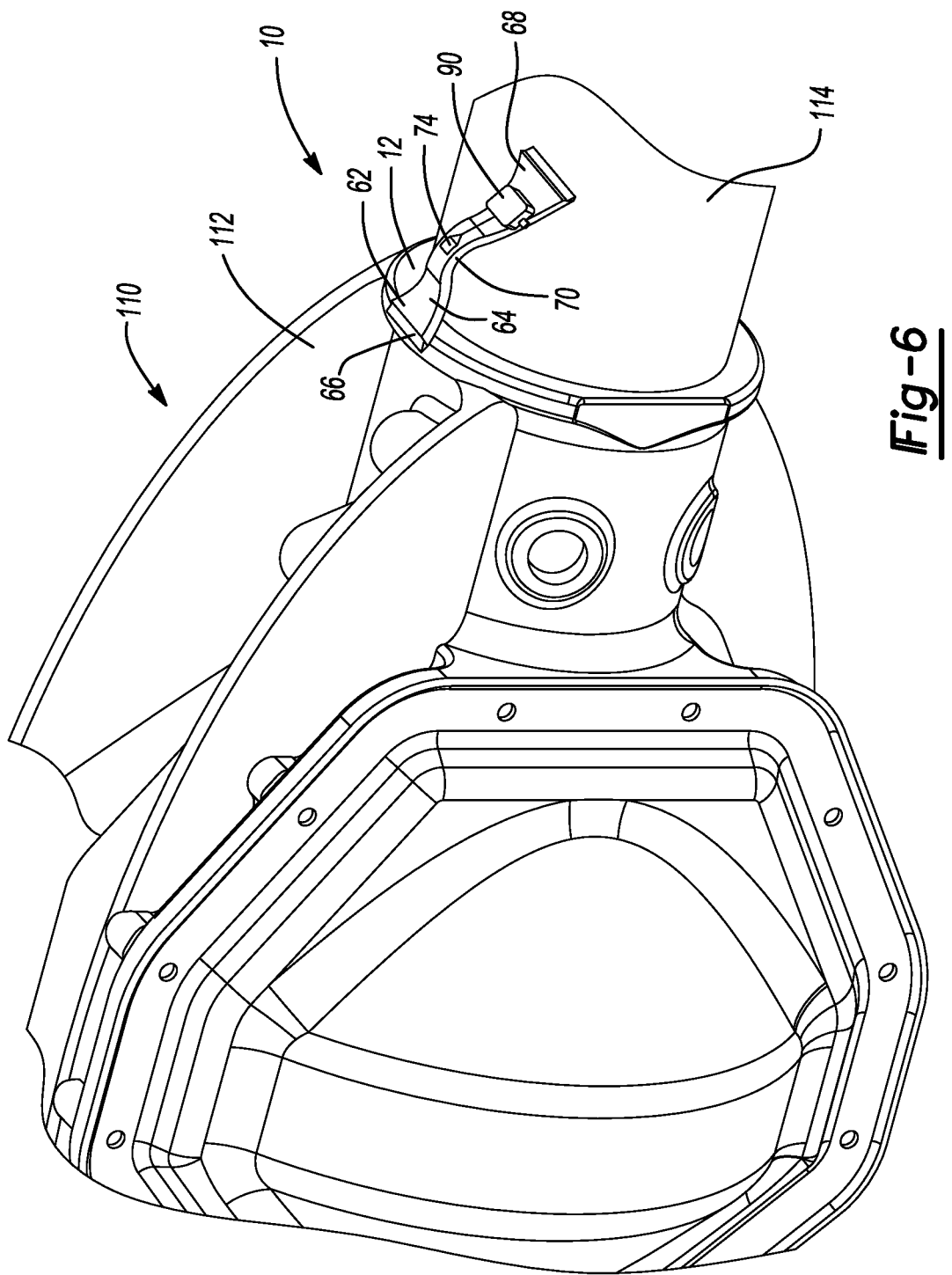

AXLE LOAD MONITORING SYSTEM (ALMS)

CROSS-REFERENCE TO RELATED APPLICATIONS

The present disclosure claims the benefit of Indian Provisional Patent Application No. 579MUM2013 filed Feb. 27, 2013, the disclosure of which is incorporated by reference as if fully set forth in detail herein.

FIELD

The present disclosure relates to weight sensing on axles of vehicles and more particularly to an axle load monitoring system.

BACKGROUND

This section provides background information related to the present disclosure which is not necessarily prior art.

Overloaded axles can contribute to unsafe driving conditions and high maintenance cost. Axle overloading can lead to rapid vehicle suspension system wear, or component failure that includes springs, shock absorbers, brakes and tires. Furthermore, overloading a vehicle increases the required stopping distance. Axle load monitoring systems have been used in the industry to detect an axle overload condition. Also, axle load monitoring systems can help while loading the vehicle. Axle load monitoring systems can help regulatory authority to monitor axle load. Furthermore, this feature can be used for ride height control by communicating with other ECUs (e.g. Suspension ECU) over CAN bus. There remains a need in the art to provide a simple, low-cost configuration that can accurately provide axle loading measurements.

SUMMARY

This section provides a general summary of the disclosure, and is not a comprehensive disclosure of its full scope or all of its features.

An axle load monitoring system configured for use on an axle housing is provided. The axle load monitoring system can include a mounting structure and a strain gauge. The mounting structure can have a first end portion, a second end portion and an intermediate portion. The first end portion can be fixedly coupled to the axle housing. The second end portion can be fixedly coupled to the axle housing. The intermediate portion can be offset away from the axle housing. The strain gauge can be fixedly coupled to the mounting structure at the intermediate portion. The strain gauge can be configured to measure strain of the mounting structure.

According to additional features, the first end portion of the mounting bracket can transition toward the intermediate portion through a first arcuate portion. The first arcuate portion can curve away from the axle housing. The first arcuate portion can transition to the intermediate portion through a second arcuate portion distinct from the first arcuate portion. The second arcuate portion can curve toward the axle housing.

According to still other features, the second end portion of the mounting bracket can transition to the intermediate portion through a third arcuate portion. The third arcuate portion can curve away from the axle housing. The third arcuate portion can transition to the intermediate portion through a fourth arcuate portion distinct from the third arcuate portion. The fourth arcuate portion can curve toward the axle housing.

According to other features, the axle load monitoring system can further comprise a wireless transmitter that receives a measurement from the strain gauge and transmits the measurement to a receiver located remotely from the axle housing. According to one configuration, the axle housing can be a banjo housing. The mounting structure can be in the shape of a wave. The first and second end portions can be welded to the axle housing. The mounting structure can be a metal bracket. The mounting structure can be unitary. The mounting structure can be fixed to an upper surface of the axle housing.

An axle load monitoring system constructed for use on an axle housing and constructed in accordance to additional features can include a unitary mounting structure and a strain gauge. The unitary mounting structure can have a first end portion, a second end portion and an intermediate portion. The intermediate portion can be located between the first and second end portions. The mounting structure can be coupled to the axle housing at the first and second end portions. The mounting structure can curve away from the first and second end portions at the axle housing toward the intermediate portion. The strain gauge can be fixedly coupled to the mounting structure at the intermediate portion. The strain gauge can be configured to measure strain of the mounting structure at the intermediate portion.

According to other features, the first end portion of the mounting structure can transition from a first arcuate portion, to a second arcuate portion and to the intermediate portion. The first and second arcuate portions can curve in opposite directions. The second end portion of the mounting structure can transition from a third arcuate portion to a fourth arcuate portion to an intermediate portion. The third and fourth arcuate portions can curve in opposite directions.

According to other features, the axle load monitoring system can include a wireless transmitter that receives a measurement from the strain gauge and transmits the measurement to a receiver located remotely from the axle housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a perspective view of the axle load monitoring system incorporated on a Salisbury axle.

Corresponding reference numerals indicate corresponding parts throughout the several views of the drawings.

DETAILED DESCRIPTION

Example embodiments will now be described more fully with reference to the accompanying drawings.

Figure 1:
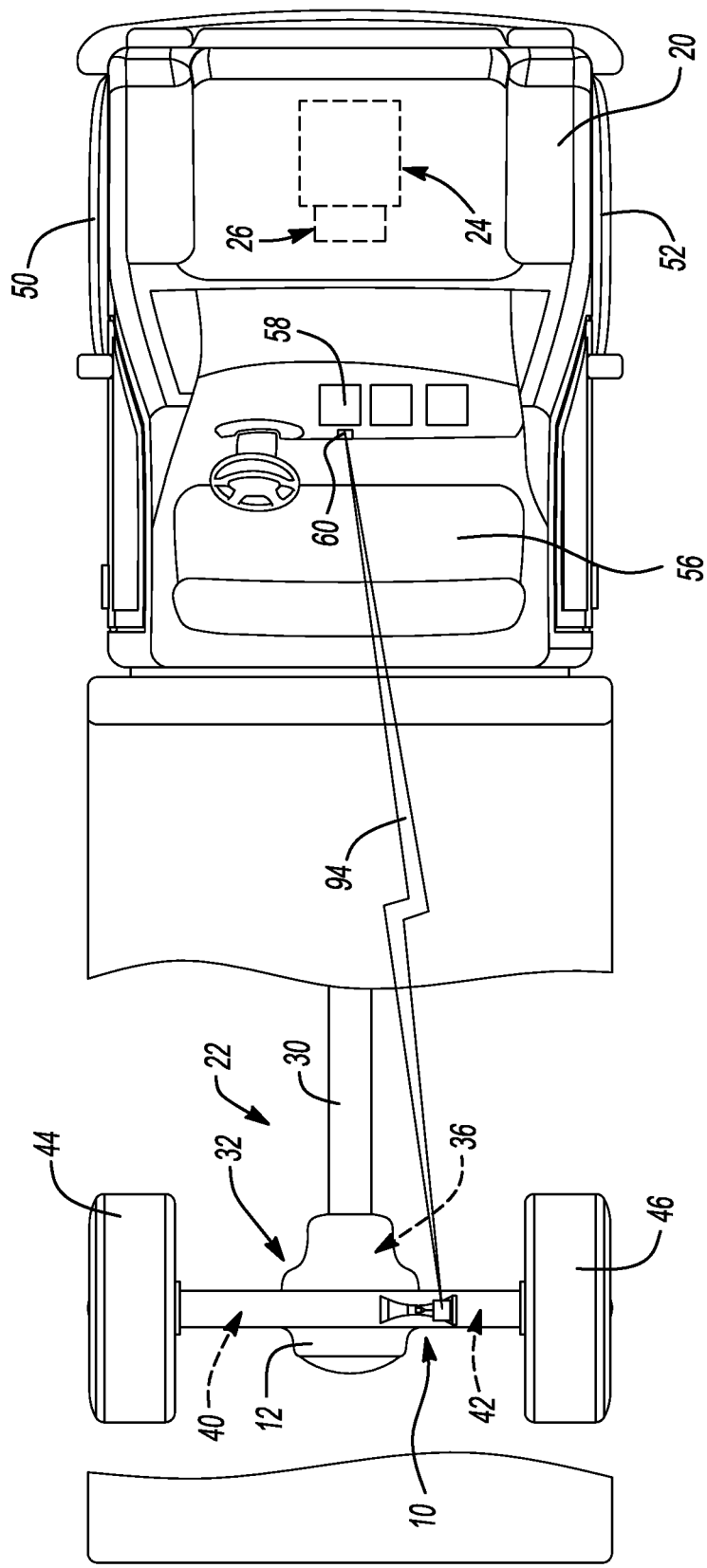
FIG. 1 is a partial plan view of a vehicle incorporating an axle load monitoring system according to one example of the present disclosure.
Figure 2:
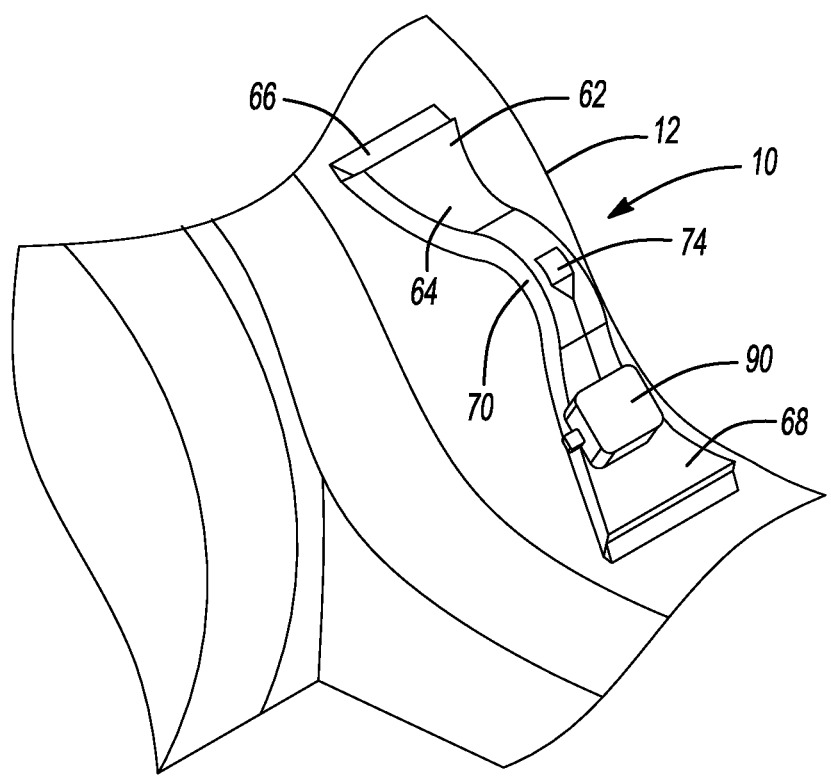
FIG. 2 is a front perspective view of the axle load monitoring system of FIG. 1.
Figure 3:
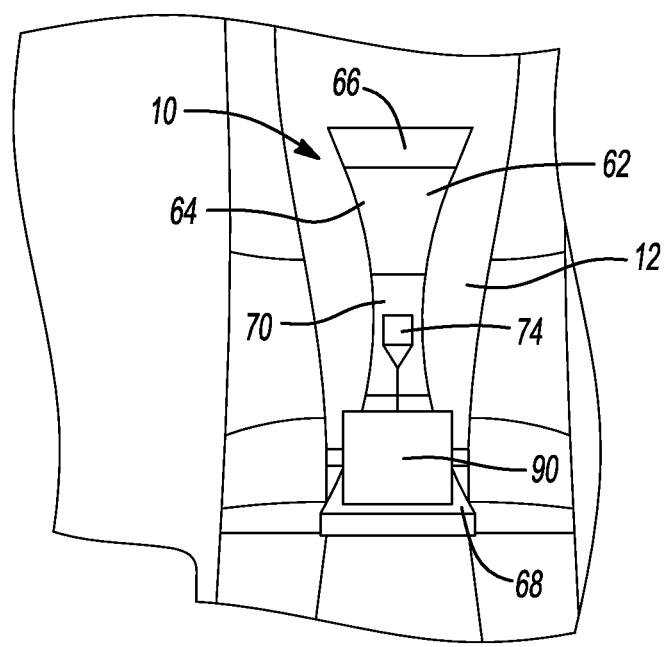
FIG. 3 is a plan view of the axle load monitoring system of FIG. 2.

With initial reference to FIG. 1, an axle load monitoring system constructed in accordance to one example of the present disclosure is shown and generally identified at reference numeral 10. The axle load monitoring system 10 is shown generally fixed to an axle housing 12 of a vehicle 20. The axle load monitoring system is shown configured on the axle housing 12 of a passenger's side of the vehicle 20. It will be appreciated that it may additionally or alternatively be coupled to the driver's side. In the example provided herein, the axle housing 12 is configured as a banjo-style housing. It will be appreciated however that the axle load monitoring system 10 may be also incorporated on axle housings having different configurations.

By way of example, the vehicle 20 can generally include a drivetrain 22 having an engine 24 and a transmission 26. An output shaft (not specifically shown) of the transmission 26 can communicate rotational motion to a propeller shaft 30. The propeller shaft 30 provides an input to a pinion shaft (not specifically shown) of a rear axle assembly 32. The rear axle assembly 32 can include the axle housing 12, a differential assembly 36 supported in the axle housing 12, and a pair of axle shafts 40 and 42, respectively interconnected to a left and a right rear wheel 44 and 46. The vehicle 20 can further include a left front wheel 50 and a right front wheel 52.

The vehicle 20 can have a cabin 56 that includes a driver information display 58. A receiver 60 can be located generally remotely from the axle load monitoring system 10 and can be configured to receive a wireless transmission from the axle load monitoring system 10 as will be described herein. The driver information display 58 can display information to a vehicle occupant regarding a status of the axle load monitoring system 10. For example, the driver information display 58 can provide an audible and/or visual indication that the axle housing 12 is overloaded.

With additional reference now to FIGS. 2-5, additional features of the axle load monitoring system 10 will be described in greater detail. The axle load monitoring system 10 can include a mounting structure 62. The mounting structure 62 can generally be in the form of a unitary metal bracket 64 having a wave-like shape. The mounting structure 62 can generally include a first end portion 66, a second end portion 68 and an intermediate portion 70 located between the first and second end portions 66 and 68. The first end portion 66 can be fixedly coupled to the axle housing 12. The second end portion 68 can be fixedly coupled to the axle housing 12. The first and second end portions 66 and 68 can be fixedly coupled to the axle housing 12 by welding. In other examples, the first and second end portions 66 and 68 can be coupled to the housing 12 by mechanical fastening such as, but not limited to, bolting. Other configurations can include adhesively coupling the first and second end portions 66 and 68 to the axle housing 12. In this regard, any fastening method is contemplated that precludes relative motion between the axle housing 12 and the respective first and second end portions 66 and 68 of the mounting structure 62. It will be appreciated that complementary structure can be additionally or alternatively incorporated on the axle housing 12 such as passages or slots that can receive portions of the mounting structure 62 and/or supplemental fasteners.

The intermediate portion 70 is generally offset away from the first and second end portions 66 and 68 as well as the axle housing 12. One or more strain gauges 74 can be fixedly coupled (such as by adhesive) to the mounting structure 62 at the intermediate portion 70. One or more strain gauges 74 can be mounted to a surface of the intermediate portion 70 in a manner (e.g., the manner of FIG. 4) that permits the strain gauge(s) 74 to measure strain that is associated with the elongation of the surface. Those of skill in the art will appreciate, however, that one or more strain gauge(s) 74 could be mounted to a surface of the intermediate portion 70 in a manner that permits the strain gauge(s) 74 to measure strain that is associated with the compression of the surface. Those of skill in the art will further appreciate that strain gauges 74 could be mounted to opposite surfaces of the intermediate portion 70 in a manner that permits one strain gauge 74 (or set of strain gauges) to measure strain that is associated with elongation of a first surface of the intermediate portion 70 and another strain gauge 74 (or set of strain gauges) to measure strain that is associated with compression of a second, opposite surface of the intermediate portion 70. The strain gauge(s) 74 can be any suitable strain gauge and can be configured to measure strain of the mounting structure 62 at the intermediate portion 70.

As will become appreciated from the following discussion, the geometrical configuration of the mounting structure 62 can provide an advantageous arrangement that is more sensitive to vertical loads transmitted to the axle housing 12 as compared to other loads including torsional loads and lateral loads. In this regard, the shape of the bracket 64 is specifically designed so as to amplify the strain values for better signal conditioning. Moreover, as the mounting structure 62 is a separate component from the axle housing 12, its assembly location can be easily changed depending on the requirements of different axle designs. Furthermore, as the mounting structure 62 is a separate component from the axle housing 12, preparation of the surface of the bracket 64 for receiving the strain gauge(s) 74, the step of securing the strain gauge(s) 74 to the bracket 64 (such as by way of adhesive), and other assembly steps can be accomplished prior to coupling the mounting structure 62 to the axle housing 12. In this regard, the axle load monitoring system 10 can be provided as a ready to assemble component made available for final assembly onto the axle housing 12.

Figure 4:
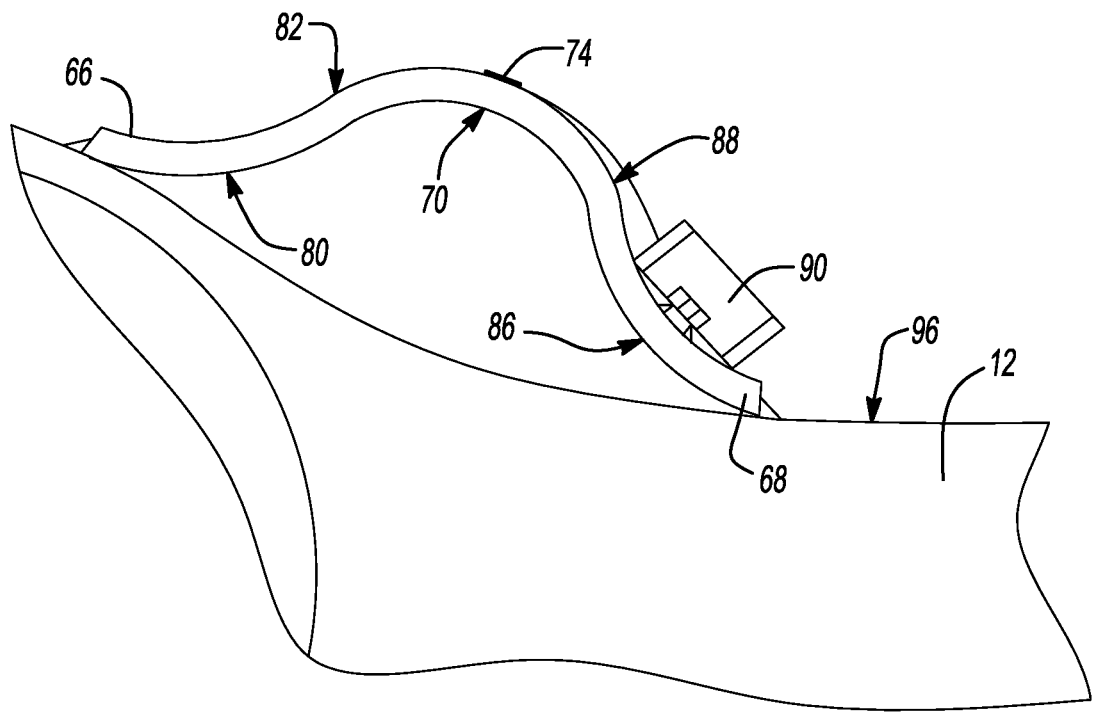
FIG. 4 is a side view of the axle load monitoring system of FIG. 2.

The first end portion 66 of the mounting structure 62 can transition toward the intermediate portion 70 through a second arcuate portion 82 (FIG. 4). The first arcuate portion 80 can curve away from the axle housing 12. The first arcuate portion can transition to the intermediate portion 70 through a second arcuate portion 82 that is distinct from the first arcuate portion 80. The second arcuate portion 82 can generally curve toward the axle housing 12. The second arcuate portion 82 can generally curve in an opposite direction from the first arcuate portion 80. The second end portion 68 of the mounting structure 62 can transition to the intermediate portion 70 through a third arcuate portion 86. The third arcuate portion 86 can generally curve away from the axle housing 12. The third arcuate portion 86 transitions to the intermediate portion 70 through a fourth arcuate portion 88 that is distinct from the third arcuate portion 86. The fourth arcuate portion 88 can generally curve in an opposite direction compared to the third arcuate portion 86. The fourth arcuate portion 88 can generally curve toward the axle housing 12.

The axle load monitoring system 10 can further incorporate a wireless transmitter 90 that communicates with the strain gauge(s) 74. The wireless transmitter 90 can be secured to the mounting structure 62 at any location such as between the second end portion 68 and the intermediate portion 70. The wireless transmitter 90 can be coupled to the mounting structure 62 by any method including welding, fastening, adhesives or other configurations. In general, the wireless transmitter 90 can receive a data input from the strain gauge(s) 74 and wirelessly transmit it to the receiver 60 such as by way of a radio frequency (RF) signal 94 (FIG. 1). It will be appreciated that other signals may be used to wirelessly communicate information from the strain gauge(s) 74 to the receiver 60. In some configurations, the axle load monitoring system 10 can further comprise a data acquisition system that stores measured strain over time. The axle load monitoring system 10 can be configured to measure strain for at least one of static and dynamic axle load conditions.

The configuration of the wireless transmitter 90 can be particularly advantageous as it removes the need for wiring between the strain gauge(s) 74 to the driver information display 58. It will be appreciated that in examples having multiple axles, the cost and time requirements can be significantly improved over traditional wired configurations. The wireless circuit provided between the wireless transmitter 90 and the receiver 60 may be designed for short-range remote control applications where cost is a primary concern. The wireless transmitter 90 does not require any external RF components. It can generate virtually no emissions, making Federal Communications Commission (FCC) and European Telecommunications Standards Institute (ETSI) approvals manageable. The design of the wireless transmitter 90 can exhibit exceptional sensitivity at a very low cost. The manufacturing-friendly Session Initiation Protocol (SIP) style package and low-cost make it particularly suitable for high volume applications. The power requirements can be low because of Amplitude-Shift Keying (ASK) transmission in which nothing is required to send for "0". Each pair of wireless transmitter 90 and receiver 60 can have a unique identification. The need for a unique identification arises for the fact that there may be a situation when two vehicles are standing adjacent to each other within each other's range of communication.

The mounting structure 62 can be configured as a unitary member. In the example shown, the mounting structure 62 can be fixed to an upper surface 96 of the axle housing 12. It will be appreciated that the mounting structure 62 can be attached at different locations to the axle housing 12 (or other axle housings) while yielding similar results.

Figure 5:
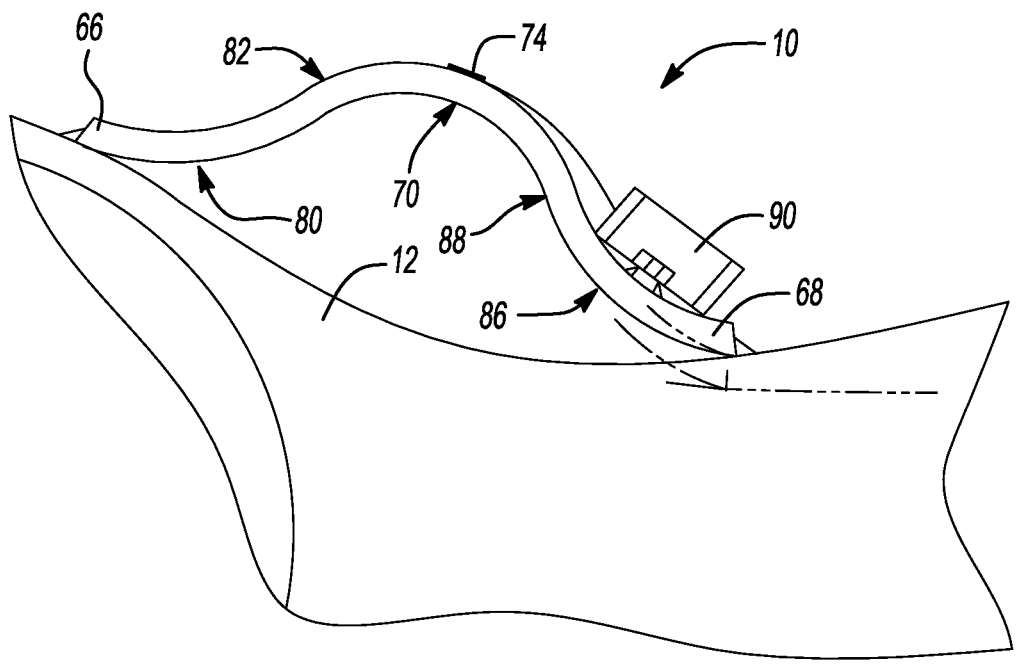
FIG. 5 is another side view of the axle load monitoring system shown in FIG. 4 and shown with the mounting structure moved from an initial position (phantom) to a deflected position (solid line) when the axle has been subjected to a load.

Turning now to FIG. 5, an axle load monitoring system 10 is shown during use. In general, the axle housing 12 is shown subjected to a vertical load (in a direction up as shown in FIG. 5) causing the axle housing to move from a first position (phantom line) to a second position (solid line). As shown, the second end portion 68 of the mounting structure 62 has been caused to deflect. It will be appreciated that other portions of the mounting structure 62 can additionally or alternatively be caused to deflect. The deflection can cause each of the strain gauges 74 to measure a strain value and communicate it to the wireless transmitter 90. The wireless transmitter 90 can then wirelessly transmit the strain measurements to the receiver 60. The receiver 60 can communicate the information to the driver information display 58 where a vehicle operator can view the information.

With reference to FIG. 6, the axle load monitoring system 10 is shown coupled to a Salisbury axle 110. Specifically, the first end portion 66 is coupled to a carrier housing 112 and the second end portion 68 is coupled to an axle tube 114. In one example, the first and second end portions 66 and 68 can be welded to the carrier housing 112 and axle tube 114, respectively. Other fastening methods, such as disclosed herein may be additionally or alternatively used. In one configuration, the axle tube 114 may be press-fit into the carrier housing 112. A slug weld may also be used between the carrier housing 112 and the axle tube 114. Regardless, the axle tube 114 is fixed to the carrier housing 112 in a fashion that precludes relative motion. The operation of the axle load monitoring system 10 on the Salisbury axle 110 is similar to that described above with respect to the banjo axle housing 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An axle load monitoring system configured for use on an axle housing, the axle load monitoring system comprising:
   a mounting structure having a first end portion, a second end portion, a first arcuate portion that has a convex side facing toward the axle housing and a concave side facing away from the axle housing, a second arcuate portion that has a concave side facing toward the axle housing and a convex side facing away from the axle housing, and an intermediate portion located between the first and second end portions, wherein the first end portion is fixedly coupled to the axle housing, the second end portion is fixedly coupled to the axle housing and the intermediate portion is offset away from the axle housing; and
   a strain gauge fixedly coupled to the mounting structure at the intermediate portion, the strain gauge configured to measure strain of the mounting structure at the intermediate portion;
   wherein the first end portion transitions to the intermediate portion through the first arcuate portion, and the first arcuate portion transitions to the intermediate portion through the second arcuate portion.

2. The axle load monitoring system of claim 1 wherein the second end portion of the mounting structure transitions to the intermediate portion through a third arcuate portion.

3. The axle load monitoring system of claim 2 wherein the third arcuate portion has a convex side facing toward the axle housing and a concave side facing away from the axle housing.

4. The axle load monitoring system of claim 3 wherein the third arcuate portion transitions to the intermediate portion through a fourth arcuate portion distinct from the third arcuate portion.

5. The axle load monitoring system of claim 4 wherein the fourth arcuate portion has a concave side facing toward the axle housing and a convex side facing away from the axle housing.

6. The axle load monitoring system of claim 1, further comprising:
   a wireless transmitter that receives a measurement from the strain gauge and transmits the measurement to a receiver located remotely from the axle housing.

7. The axle load monitoring system of claim 1 wherein the axle housing is a banjo housing.

8. The axle load monitoring system of claim 1 wherein the axle housing is a Salisbury axle beam.

9. The axle load monitoring system of claim 1 wherein the mounting structure is in the shape of a wave.

10. The axle load monitoring system of claim 1 wherein the first and second end portions are welded to the axle housing.

11. The axle load monitoring system of claim 1 wherein the mounting structure is a metal bracket.

12. The axle load monitoring system of claim 11 wherein the mounting structure is unitary.

13. The axle load monitoring system of claim 12 wherein the mounting structure is fixed to an upper surface of the axle housing on at least one of a driver's side and passenger's side of a vehicle.

14. The axle load monitoring system of claim 1, wherein one of the first and second end portions is fixedly coupled to a carrier housing of the axle housing, and the other of the first and second end portions is fixedly coupled to an axle tube of the axle housing, the carrier housing adapted to house a differential assembly.

15. The axle load monitoring system of claim 1, wherein the first end portion is fixedly coupled to a first section of the axle housing, and the second end portion is fixedly coupled to a second section of the axle housing that is not co-planar with the first section of the axle housing.

16. An axle load monitoring system configured for use on an axle housing, the axle load monitoring system comprising:
    a unitary mounting structure having a first end portion, a second end portion and an intermediate portion located between the first and second end portions, wherein the mounting structure is coupled to the axle housing at the first and second end portions and is in the shape of a wave that curves away from the axle housing at the first and second end portions toward a crest of the wave at the intermediate portion; and
    a strain gauge fixedly coupled to the mounting structure at the intermediate portion, the strain gauge configured to measure strain of the mounting structure at the intermediate portion.

17. The axle load monitoring system of claim 16 wherein the first end portion of the mounting structure transitions from a first arcuate portion, to a second arcuate portion and to the intermediate portion, wherein the first and second arcuate portions curve in opposite directions, and wherein the second end portion of the mounting structure transitions from a third arcuate portion to a fourth arcuate portion to the intermediate portion, wherein the third and fourth arcuate portions curve in opposite directions.

18. The axle load monitoring system of claim 17, further comprising:
    a wireless transmitter that receives a measurement from the strain gauge and transmits the measurement to a receiver located remotely from the axle housing.

19. The axle load monitoring system of claim 16 wherein the strain gauge measures strain for at least one of static and dynamic axle load.

20. The axle load monitoring system of claim 16, further comprising a data acquisition system that stores the measured strain over time.

21. The axle load monitoring system of claim 16, wherein one of the first and second end portions is fixedly coupled to a carrier housing of the axle housing, and the other of the first and second end portions is fixedly coupled to an axle tube of the axle housing, the carrier housing adapted to house a differential assembly.

22. The axle load monitoring system of claim 16, wherein the first end portion is fixedly coupled to a first section of the axle housing, and the second end portion is fixedly coupled to a second section of the axle housing that is not co-planar with the first section of the axle housing.

* * * * *